United States Patent Office 2,862,172
Patented Nov. 25, 1958

2,862,172

MINIMUM EXCITATION LIMIT CIRCUITS

James T. Carleton, Glen Burnie, Md., and Powell O. Bobo, Wilkinsburg, Pa., assignors to Westinghouse Electric Corporation, East Pittsburgh, Pa., a corporation of Pennsylvania Application May 20, 1955, Serial No. 509,756

4 Claims. (Cl. 322—25)

This invention relates to generator regulator systems and more particularly to minimum excitation limit circuits associated therewith.

In addition to maintaining the output voltage of a generator substantially constant, it is also desirable to provide a minimum excitation limit circuit for the generator so that the generator will not fall out of step. The minimum excitation limit circuits of the prior art have many disadvantages. For instance, many of these prior art minimum excitation limit circuits are responsive to the field voltage of the generator and, therefore, are subject to changes in the temperature of the air surrounding the generator. In addition, many of these prior art minimum excitation limit circuits can not safely be adjusted to a magnitude closely approaching the pull-out point for the generator. Therefore, the generator associated with this prior art minimum excitation limit circuit is not able to take full advantage of its leading power factor characteristic.

Another disadvantage of many of the prior art minimum excitation limit circuits is that the magnitude of the minimum excitation limit can not readily be changed from one magnitude to the other.

An object of this invention is to provide a regulator system for a dynamoelectric machine in which provision is made for insuring minimum excitation of the machine.

Another object of this invention is to provide for obtaining a minimum excitation limit for a generator which varies as the square of the generator terminal voltage so as to match the pull-out characteristic of the generator which also varies as the square of the generator terminal voltage.

A further object of this invention is to provide readily adjustable means for changing the magnitude of the minimum excitation limit for a generator.

A still further object of this invention is to provide a minimum excitation limit circuit for a generator, which circuit is substantially independent of changes in the temperature of the air surrounding the generator.

Another object of this invention is to provide for obtaining a minimum excitation limit circuit for a generator by means of apparatus comprising static components.

Other objects of this invention will become apparent from the following description when taken in conjunction with the accompanying drawings in which.

Figure 1:
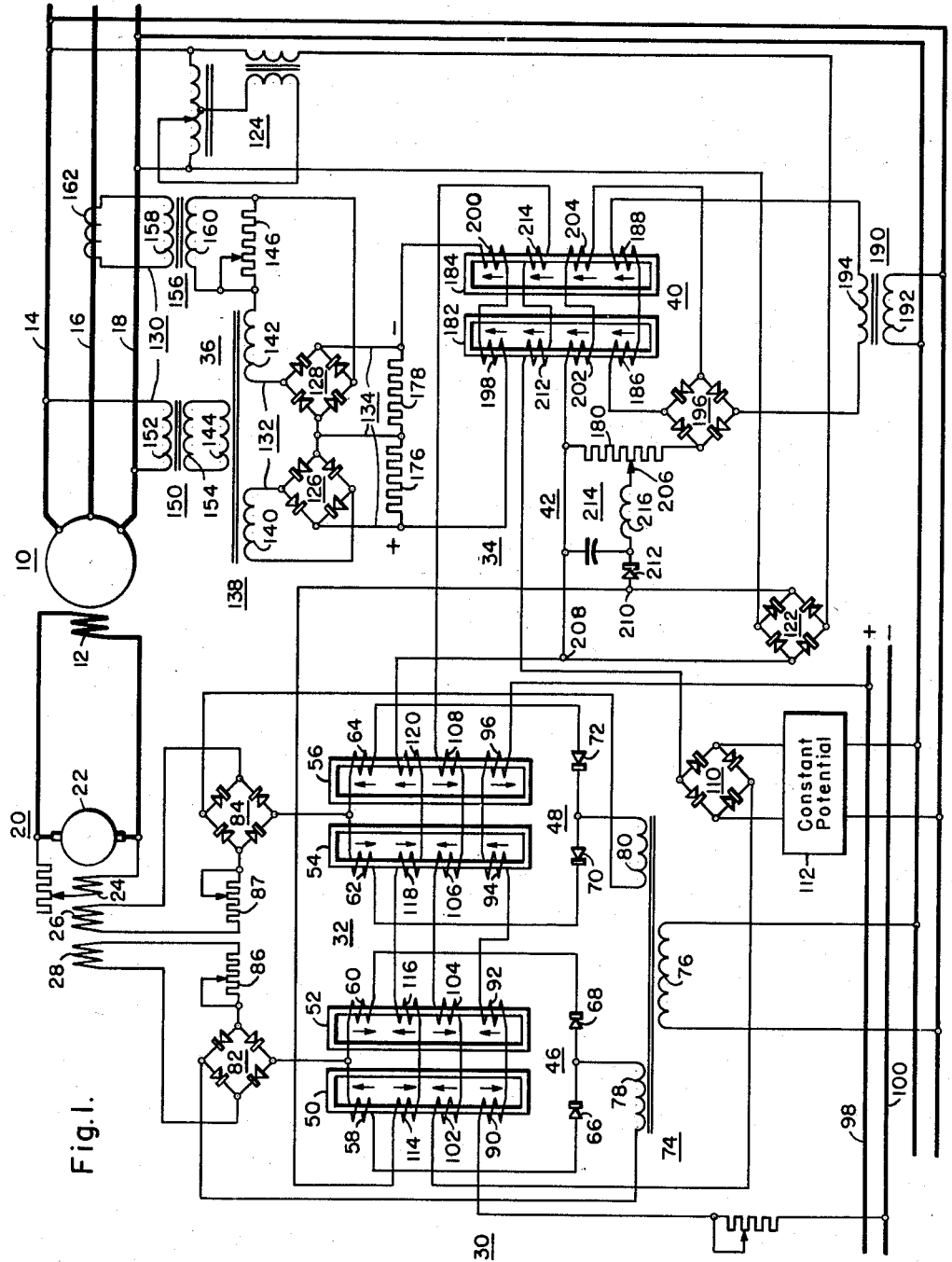
Figure 1 is a schematic diagram of apparatus and circuits illustrating this invention.

Referring to Fig. 1, there is illustrated a three-phase non-salient pole generator 10 having a field winding 12. In this instance, the generator 10 is disposed to supply energy to line conductors 14, 16 and 18 which are part of a three-phase electrical system or circuit. In order to obtain an excitation voltage across the field winding 12 of relatively large magnitude, an exciter 20 is provided. In this instance, the exciter 20 comprises an armature 22 which supplies current to the field winding 12 of the generator 10, a self-exciting winding 24 which is connected in shunt with the armature 22, and buck and boost field windings 26 and 28, respectively, the purpose of which will be explained hereinafter. In order to maintain the output voltage of the generator 10 substantially constant, a regulator loop 30, comprising a push-pull magnetic amplifier 32, is interconnected between the output of the generator 10 and the buck and boost field windings 26 and 28 of the exciter 20.

A minimum excitation limit circuit 34 is connected to the output of the generator 10 and cooperates with the push-pull magnetic amplifier 32, of the regulator loop 30, to prevent the generator 10 from falling out of step. In general, the minimum excitation limit circuit 34 comprises a sensing circuit 36, a magnetic amplifier 40 which is responsive to the output voltage of the sensing circuit 36, and a shunting circuit 42 which shunts a portion of the control signal for the push-pull magnetic amplifier 32 away from the amplifier 32 once the magnitude of the output voltage of the magnetic amplifier 40 reaches a predetermined value, to thereby maintain a minimum excitation limit for the generator 10.

As hereinbefore mentioned, the regulator loop 30 is provided in order to maintain the magnitude of the output voltage of the generator 10 substantially constant. For purposes of clarity, the components and operation of the regulator loop 30 will be described before describing the various components and operation of the minimum excitation limit circuit 34.

As illustrated, the push-pull magnetic amplifier 32 is of standard construction and comprises two main sections 46 and 48. The section 46 comprises two magnetic core members 50 and 52, and the section 48 comprises two magnetic core members 54 and 56. In this instance, load windings 58, 60, 62 and 64 are disposed in inductive relationship with the magnetic core members 50, 52, 54 and 56, respectively. As is customary, self-saturation for the magnetic amplifier 32 is obtained by connecting in series circuit relationship with the load windings 58, 60, 62 and 64 self-saturating rectifiers 66, 68, 70 and 72, respectively.

In order to form a doubler circuit of the section 46, the series circuit including the load winding 58 and the self-saturating rectifier 66 is connected in parallel circuit relationship with the series circuit including the load winding 60 and the self-saturating rectifier 68. In like manner, in order to form a doubler circuit of the section 48, the series circuit including the load winding 62 and the self-saturating rectifier 70 is connected in parallel circuit relationship with the series circuit including the load winding 64 and the self-saturating rectifier 72.

Energy for the load windings 58, 60, 62 and 64, of the magnetic amplifier 32, is received from a transformer 74 having a primary winding 76, which in this instance is responsive to the output voltage of the generator 10, and secondary winding sections 78 and 80. As illustrated, a full-wave dry-type load rectifier 82 is interconnected with the hereinbefore described parallel circuit of the section 46, and with the secondary winding section 78, of the transformer 74, in order to produce a direct-current output for the section 46. In like manner, a full-wave dry-type load rectifier 84 is interconnected with the hereinbefore described parallel circuit of the section 48, and with the secondary winding section 80, of the transformer 74, in order to obtain a direct-current output for the section 48.

In this instance, the boost field winding 28 of the exciter 20 is responsive to the output of the load rectifier 82 and the buck field winding 26 of the exciter 20 is responsive to the output of the load rectifier 84. In operation, the buck field winding opposes the boost field winding 28. In order to provide means for changing the gain in the regulator loop 30, variable resistors 86 and 87 are connected in series circuit relationship with the boost field winding 28 and with the buck field winding 26, respectively.

For the purpose of biasing each of the sections 46 and 48 of the magnetic amplifier 32 to approximately half its output, bias windings 90, 92, 94 and 96 are disposed in inductive relationship with the magnetic core members 50, 52, 54 and 56, respectively. In particular, the bias windings 90, 92, 94 and 96 are connected in series circuit relationship with one another, the series circuit being connected to conductors 98 and 100 which have applied thereto a substantially constant direct-current voltage. In operation, the current flow through the bias windings 90, 92, 94 and 96 produces a magnetomotive force with respect to their respective magnetic core members that opposes the magnetomotive force produced by the current flow through the load windings 58, 60, 62 and 64, respectively.

In order to obtain a reference point from which to operate from in each of the sections 46 and 48 of the magnetic amplifier 32, reference windings 102, 104, 106 and 108 are disposed in inductive relationship with the magnetic core members 50, 52, 54 and 56, respectively. The reference windings 102, 104, 106 and 108 are so disposed on their respective magnetic core members 50, 52, 54 and 56 that the current flow through the reference windings 102, 104 produces a magnetomotive force that opposes the magnetomotive force produced by the respective bias windings 90 and 92, and that the current flow through the reference windings 106 and 108 produces a magnetomotive force that is additive to the magnetomotive force produced by the respective bias windings 94 and 96. As illustrated, the reference windings 102, 104, 106 and 108 are connected in series circuit relationship with one another and with other windings which will be described hereinafter, the series circuit being connected to the output terminals of a full-wave dry-type rectifier 110. In order that the current flow through the reference windings 102, 104, 106 and 108 remains substantially constant, the input terminals of the rectifier 110 are connected to a constant potential device 112 which produces at its output a substantially constant alternating current irrespective of the magnitude of the output voltage of the generator 10, to which the constant potential device 112 is responsive.

As is customary, control windings 114, 116, 118 and 120 are disposed in inductive relationship with the magnetic core members 50, 52, 54 and 56, respectively. The control windings 114, 116, 118 and 120 are connected in series circuit relationship with one another, the series circuit being connected to the output terminals of a full-wave dry-type rectifier 122. The input terminals of the rectifier 122 are connected to the line conductors 14 and 18 through a variac 124. A very small change in the magnitude of the current flow through the control windings 114, 116, 118 and 120 can be obtained by adjusting the variac 124.

The control windings 114, 116, 118 and 120 are so disposed on their respective magnetic core members 50, 52, 54 and 56 that when current flows therethrough a magnetomotive force is produced in the respective magnetic core members that opposes the magnetomotive force produced by the current flow through the respective reference windings 102, 104, 106 and 108. Thus, in operation, when the output voltage of the generator 10 increases to a value above its regulated value, the current flow through the control windings 114, 116, 118 and 120 increases to thereby decrease the output current from the section 46 of the amplifier 32 and increase the output current from the section 48 of the push-pull magnetic amplifier 32. Such an action increases the current flow through the buck field winding 26 of the exciter 20 and decreases the current flow through the boost field winding 28 to thereby decrease the output voltage of the exciter 20. A decrease in the output voltage of the exciter 20 decreases the magnitude of the voltage across the field winding 12 of the generator 10 to thereby return the output voltage of the generator 10 to its regulated value.

On the other hand, a decrease in the output voltage of the generator 10 to a value below its regulated value decreases the magnitude of the current flow through the control windings 114, 116, 118 and 120. A decrease in the current flow through the control windings 114, 116, 118 and 20 unbalances the push-pull magnetic amplifier 32 in such a direction that the output current from the section 46 of the amplifier 32 increases and the output current from the section 48 decreases. Such an action increases the magnitude of the current flow through the boost field winding 28 of the exciter 20 and decreases the magnitude of the current flow through the buck field winding 26. This, in turn, increases the magnitude of the output voltage of the exciter 20 as well as the magnitude of the voltage across the field winding 12 of the generator 10, to thereby return the magnitude of the output voltage of the generator 10 to its regulated value.

The minimum excitation limit circuit 34 will now be described. Broadly, the sensing circuit 36 comprises two full-wave dry-type rectifier units 126 and 128, each having input and output terminals; an impedance circuit 130 connected to the electrical circuit, which includes the conductors 14, 16 and 18, to be energized by a measure of the current flowing in the electrical circuit and by a measure of the voltage in the electrical circuit; circuit means 132 connected to the impedance circuit 130 for applying to the input terminals of both of the rectifier units 126 and 128 a voltage proportional to the measure of the voltage in the electrical circuit, the measure of the voltage in the electrical circuit, including the conductors 14 and 18, that is applied to the rectifier 126 being of substantially greater magnitude than the measure of the voltage in the electrical circuit that is applied to the rectifier 128, and for applying to the input terminals of the rectifier 128 a voltage proportional to the measure of the current flowing in the electrical circuit, which includes the conductors 14, 16 and 18; and an electrical network 134 connected to the output terminals of the rectifiers 126 and 128 for producing at its output a direct-current voltage that is a measure of the difference in the output voltages of the two rectifiers 126 and 128.

Specifically, the impedance circuit 130 comprises a potential transformer 138 having two secondary winding sections 140 and 142 and a primary winding 144 connected to be responsive to the voltage across two phases of the three-phase electrical circuit, which includes the conductors 14, 16 and 18; and an impedance member, specifically a variable resistor 146, responsive to a measure of the current flowing in the remaining phase of the three-phase electrical circuit including the conductors 14, 16 and 18. In order to obtain the proper magnitude of voltage across the primary winding 144 of the transformer 138, a potential transformer 150, having a primary winding 152 and a secondary winding 154, is interconnected between the primary winding 144 of the transformer 138 and the line conductors 14 and 18. Specifically, the primary winding 152 of the transformer 150 is connected to the line conductors 14 and 18 and the secondary winding 154 of the transformer 150 is connected to the primary winding 144 of the potential transformer 138. In like manner, in order to obtain the proper magnitude of voltage across the variable resistor 146, a current transformer 156, having a primary winding 158 and a secondary winding 160 is interconnected between the variable resistor 146 and a current transformer 162 which is disposed to be responsive to the magnitude of the current flow through the line conductor 16. As illustrated, the primary winding 158 of the current transformer 156 is connected to the current transformer 162. On the other hand, the secondary winding 160 of the current transformer 156 is connected to the variable resistor 146.

Figure 2:
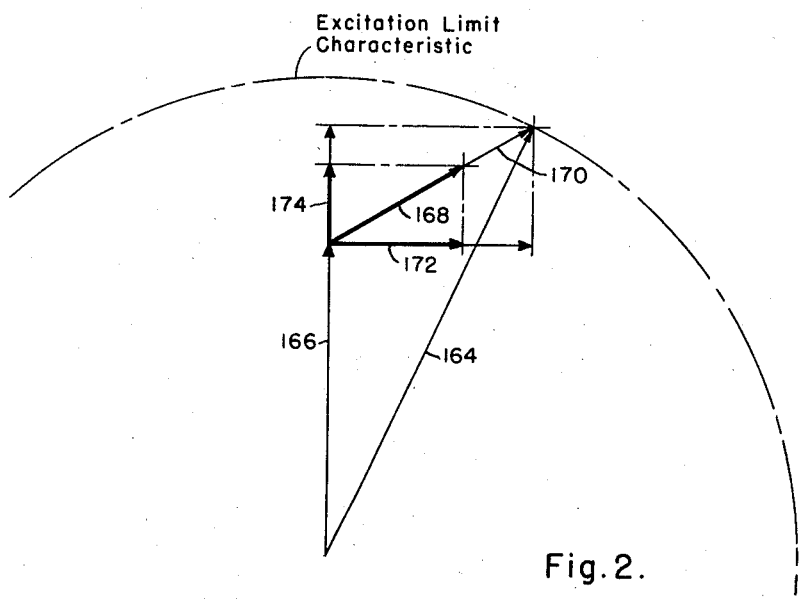
Fig. 2 is a diagram illustrating the various voltage components that are obtained by utilizing the minimum excitation limit circuit as shown in Fig. 1.

In order to apply a voltage to the input terminals of the rectifier 126 that is a measure of the terminal voltage of the generator 10, the secondary winding section 140, of the potential transformer 138, is connected to the input terminals of the rectifier 126. This measure of the terminal voltage of the generator 10 which is applied to the input terminals of the rectifier 126 is represented in Fig. 2 by a vector 164. Thus, as the terminal voltage of the generator 10 changes, the excitation limit characteristic shown in Fig. 2 moves in and out accordingly.

On the other hand, in order to apply to the input terminals of the rectifier 128 a voltage proportional to the vector sum of the voltages across the variable resistor 146 and the secondary winding section 142 of the potential transformer 138, the variable resistor 146 and the secondary winding section 142 are connected in series circuit relationship with one another, the series circuit being connected to the input terminals of the rectifier 128. The voltage across the secondary winding section 142 is likewise proportional to the terminal voltage of the generator 10, however, the voltage across the secondary winding section 140 is always of substantially greater magnitude than the voltage across the secondary winding section 142 of the potential transformer 138. In Fig. 2, a vector 166 represents the voltage across the secondary winding section 142 of the potential transformer 138. The voltage across the variable resistor 146, as hereinbefore mentioned, varies in accordance with the magnitude of the current flow through the line conductor 16. In Fig. 2, the voltage across the variable resistor 146 for a given set of conditions is represented by a vector 168.

As can be seen from Fig. 2, the vector sum of the vectors 166 and 168 is not equal to the magnitude of the vector 164 and, therefore, the minimum excitation limit circuit 34 under such conditions is not affecting the magnitude of the voltage across the field winding 12 of the generator 10. Instead, under such conditions the regulator loop 30 is controlling the magnitude of the voltage across the field winding 12. However, as will be explained more fully hereinafter, if load conditions are such that the voltage across the variable resistor 146 increases to a magnitude as represented by a vector 170 shown in Fig. 2, then the minimum excitation limit circuit 34 comes into play to control the magnitude of the voltage across the field winding 12 of the generator 10, to thus maintain a minimum excitation limit for the generator.

Figure 3:
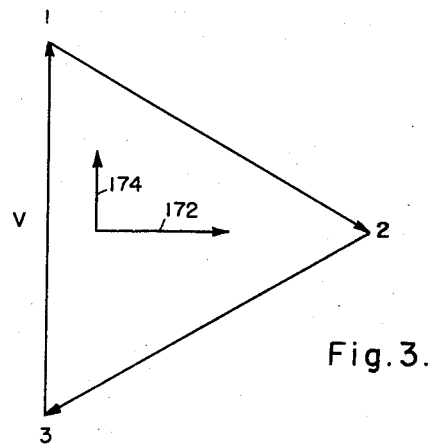
Fig. 3 is a graph illustrating the three-phase generator terminal voltage and phase 2 current components when the generator is operating at a leading power factor.

In Fig. 2 the X and Y components of the vector 168 are represented by vectors 172 and 174, respectively. On the other hand, Fig. 3 shows the relationship of these vectors 172 and 174 to the generator three-phase terminal voltage at leading factor for the generator.

The pull-out characteristic for the generator 10 varies as the square of the terminal voltage of the generator. Referring to Fig. 2, the excitation limit characteristic, as provided by the sensing circuit 36, moves in and out in accordance with the terminal voltage of the generator 10. In accordance with the corresponding power diagram (not shown) the excitation limit characteristic moves in and out in accordance with the square of the terminal voltage of the generator 10. Thus, the excitation limit circuit 34 is a kva. minimum excitation limit circuit which follows the pull-out characteristic of the generator 10 and maintains the apparatus within the limit characteristic even though the magnitude of the generator terminal voltage varies.

In this instance, the electrical network 134 comprises two load resistors 176 and 178. The load resistor 176 is connected to the output terminals of the rectifier 126 and the load resistor 178 is connected to the output terminals of the rectifier 128, the resistors 176 and 178 being connected in series circuit relationship with one another so that the net voltage across the resistors 176 and 178 is proportional to the difference in the specific voltages appearing across each of the resistors.

The magnetic amplifier 40 is provided in order to amplify the net voltage appearing across the load resistors 176 and 178 and to produce across a variable impedance member, specifically a resistor 180, a voltage that varies in accordance with the magnitude and polarity of the net voltage appearing across the load resistors 176 and 178. In this instance, the magnetic amplifier 40 comprises magnetic core members 182 and 184. Load windings 186 and 188 are disposed in inductive relationship with the magnetic core members 182 and 184, respectively. In order to supply energy to the load windings 186 and 188, a potential transformer 190, having a primary winding 192 and a secondary winding 194, is interconnected with a full-wave dry-type rectifier 196 and with the load windings 186 and 188. Specifically, the primary winding 192 of the transformer 190 is connected to the line conductors 14 and 18. On the other hand, the secondary winding 194 of the potential transformer 190 is connected in series circuit relationship with the load windings 186 and 188, the series circuit being connected to the input terminals of the rectifier 196.

In order to render the magnetic amplifier 40 responsive to the net direct-current voltage appearing across the load resistors 176 and 178 of the sensing circuit 36, control windings 198 and 200 are disposed in inductive relationship with the magnetic core members 182 and 184, respectively. In particular, the control windings 198 and 200 are connected in series circuit relationship with one another, the series circuit being connected across the load resistors 176 and 178 of the sensing circuit 36.

For the purpose of providing a higher gain for the magnetic amplifier 40, feedback windings 202 and 204 are disposed in inductive relationship with the magnetic core members 182 and 184, respectively. As illustrated, the feedback windings 202 and 204 are connected in series circuit relationship with the variable resistor 180, the series circuit being connected to the output terminals of the rectifier 196. The feedback windings 202 and 204 are so disposed on their respective core members 182 and 184 that the current flow through the feedback windings 202 and 204 produces a magnetomotive force with respect to the respective core members 182 and 184 that aids the magnetomotive force produced by the current flow through the control windings 198 and 200 when the output voltage of the sensing circuit 36 is of a polarity as shown. Thus, the feedback windings 202 and 204 provide positive feedback for the magnetic amplifier 40.

In order to provide a direct-current voltage between the upper end of the variable resistor 180, as shown, and a movable contact member 206 that is of equal magnitude to the direct-current voltage between the points 208 and 210, when the current flow through the control windings 198 and 200 of the magnetic amplifier 40 is of zero magnitude, reference windings 212 and 214 are disposed in inductive relationship with the magnetic core members 182 and 184, respectively. Current flow through the reference windings 212 and 214 produces a magnetomotive force that aids the magnetomotive force produced by the current flow through the feedback windings 202 and 204. The reference windings 212 and 214 are connected in series circuit relationship with one another and in series circuit relationship with the reference windings 102, 104, 106 and 108 of the push-pull magnetic amplifier 32. This latter series circuit is connected to the output terminals of the rectifier 110. Thus, a substantially constant current flows through the reference windings 212 and 214 of the magnetic amplifier 40.

In order to prevent the minimum excitation circuit 34 from supplying current to the control windings 114, 116, 118 and 120 of the push-pull magnetic amplifier 32 when the magnitude of the voltage between the upper end of the variable resistor 180, as shown, and the movable contact member 206 is of greater magnitude than the magnitude of the voltage between the points 208 and 210, a rectifier 212 is provided. Specifically, the rectifier 212 connects a predetermined portion of the variable resistor 180 in parallel circuit relationship with the series connected control windings 114, 116, 118 and 120 of the push-pull magnetic amplifier 32. The voltage across the predetermined portion of the variable resistor 180 is filtered by means of a filter 214 in order to give a low ripple voltage and thus insure proper action of the rectifier 212. The filter choke 216 of the filter 214 is designed to saturate when the rectifier 212 begins to conduct in the forward direction, to thereby reduce the response time.

Before putting the apparatus shown in Fig. 1 into operation, the desired value of minimum excitation limit for the generator 10 is obtained by properly adjusting the sensing circuit 36. For instance, the magnitude of the minimum excitation limit for a given set of conditions can be changed by either adjusting the variable resistor 146 or by changing the turns ratio between the secondary winding sections 140 and 142 of the potential transformer 138.

The operation of the minimum excitation circuit 34 will now be described. Assuming the apparatus is operating well within the minimum excitation limit then the voltage applied to the input terminals 126 is represented by the vector 164 and the input voltage applied to the input terminals of the rectifier 128 is represented by the vectors 166 and 168. When these alternating voltages applied to the input terminals of the rectifiers 126 and 128 are rectified, the direct-current voltage appearing across the load resistor 176 is of greater magnitude than the direct-current voltage appearing across the load resistor 178. Thus, under such assumed conditions of operating within the minimum excitation limit the polarity of the net voltage across the load resistors 176 and 178 is as shown in Fig. 1.

When the apparatus is operating within the minimum excitation limit and the net voltage across the resistors 176 and 178, of the sensing circuit 36, is of a polarity as shown in Fig. 1, the current flow through the control windings 198 and 200, of the magnetic amplifier 40, is such as to produce a direct-current voltage between the upper end of the variable resistor 180, as shown, and the movable contact member 206 which is of greater magnitude than the magnitude of the direct-current voltage appearing between the points 208 and 210. Such being the case the rectifier 212 of the shunting circuit 42 blocks the flow of current from the variable resistor 180 and thus the field winding 12 of the generator 10 is under the control of the regulator loop 30.

Assuming the system conditions are such that the alternating voltages applied to the input terminals of the rectifiers 126 and 128 are as represented by the vectors 164, 166 and 170, as shown in Fig. 2, then the net voltage across the resistors 176 and 178 decreases to a predetermined value of zero magnitude. With the net voltage across the resistors 176 and 178 of zero magnitude substantially no current flows through the control windings 198 and 200 of the magnetic amplifier 40 and the magnitude of the direct-current voltage between the upper end of the variable resistor 180, as shown, and the movable contact member 206 is substantially equal to the magnitude of the direct-current voltage appearing between the points 208 and 210.

However, assuming the system conditions change further, such that the voltage across the load resistor 178 becomes greater in magnitude than the voltage across the load resistor 176, then the minimum excitation circuit 34 comes into play. For instance, the polarity of the net voltage across the load resistors 176 and 178 reverses and current flows from the right end of the resistor 178, as shown, through the control windings 200 and 198, of the magnetic amplifier 40, to the left end of the load resistor 176, as shown. The current flow through the control windings 200 and 198 effects a magnetomotive force with respect to each of the magnetic core members 184 and 182 that opposes the magnetomotive force produced with respect to the respective magnetic core members 184 and 182 by the current flow through the reference windings 214 and 212, respectively. Such an action decreases the magnitude of the direct-current voltage appearing between the movable contact member 206 and the upper end of the variable resistor 180, as shown, to such a value that it is of lesser magnitude than the direct-current voltage appearing between the points 208 and 210. This, in turn, effects a shunting of a portion of the control current, as received from the output of the rectifier 122 through the predetermined portion of the variable resistor 180. In other words, as the voltage between the movable contact member 206 and the upper end of the variable resistor 180, as shown, decreases below the value of the voltage between the points 208 and 210, a portion of the control current is by-passed around the control windings 114, 116, 118 and 120 of the push-pull magnetic amplifier 32 of the regulator loop 30.

With a decrease in the magnitude of the current flow through the control windings 114, 116, 118 and 120 of the push-pull magnetic amplifier 32, the output of the section 46 of the amplifier 32 is increased and the output of the section 48 is decreased. This increases the magnitude of the current flow through the boost field winding 28 of the exciter 20 and decreases the magnitude of the current flow through the buck field winding 26. With such as increase in the magnitude of the current flow through the boost field winding 28, the output voltage of the exciter 20 is increased, to thus increase the magnitude of the current flow through the field winding 12 of the generator 10 and thereby prevent the generator 10 from falling out of step.

The previously described apparatus is for maintaining a static minimum excitation limit. However, it is to be understood that by retarding the measure of the output current of the generator 10, as taken from phase 2, or by advancing the measure of the terminal voltage of the generator 10, as taken from phases 1 and 3, the apparatus illustrated in Fig. 1 can be adjusted so as to maintain a dynamic minimum excitation limit.

The apparatus embodying the teachings of this invention has several advantages. For instance, the operation of the minimum excitation circuit 34 is not affected by the temperature of the air surrounding the field winding 12 of the generator 10. In addition, the static minimum excitation limit for the generator 10 for a given set of conditions can be very quickly changed to a new value by merely adjusting the variable resistor 146 or by changing the turns ratio between the secondary winding sections 140 and 142 of the potential transformer 138. Also, it is to be noted that the minimum excitation circuit 34 comprises static components. Thus, maintenance problems are minimized.

Since numerous changes may be made in the above-described apparatus and circuits, and different embodiments of the invention may be made without departing from the spirit and scope thereof, it is intended that all the matter contained in the foregoing description or shown in the accompanying drawings shall be interpreted as illustrative and not in a limiting sense.

We claim as our invention:

1. In a regulator system for a generator having a field winding and disposed to supply energy to an electrical system, the combination comprising, a sensing circuit including two rectifier units each having input and output terminals, an impedance circuit connected to the electrical circuit to be energized by a measure of a current flowing in the electrical circuit and by a measure of a voltage in the electrical circuit, circuit means connected to said impedance circuit for applying to the input terminals of both of the rectifier units a voltage proportional to said measure of the voltage in the electrical circuit, said voltage applied to one of the rectifier units being of substantially greater magnitude than said voltage applied to the other of the rectifier units, and for applying only to the input terminals of said other of the rectifier units a voltage proportional to said measure of the current flowing in the electrical circuit, and an electrical network connected to the output terminals of the two rectifier units for producing at its output a direct-current voltage that is a measure of the difference in the output voltages of the two rectifier units, and further circuit means for rendering the field winding of the generator responsive to said direct-current voltage once the relative magnitudes of the output voltage of the two rectifier units reach a predetermined value, to thereby provide a minimum excitation limit for the generator which follows the pull-out characteristic of said generator.

2. In a regulator system for a generator having a field winding and disposed to supply energy to a three-phase circuit, the combination comprising, a sensing circuit including two rectifier units each having input and output terminals, a potential transformer having two secondary winding sections and a primary winding responsive to the voltage across two phases of the three-phase circuit, an impedance member responsive to the current flow through the third phase of the three-phase circuit, circuit means for connecting one of the secondary winding sections to the input terminals of one of the two rectifier units, other circuit means for connecting the other secondary winding section in series circuit relationship with said impedance member and for connecting the series circuit to the input terminals of the other of the two rectifier units, and an electrical network connected to the output terminals of the two rectifier units for producing at its output a direct-current voltage that is a measure of the difference in the output voltages of the two rectifier units, and further circuit means for rendering the field winding of the generator responsive to said direct-current voltage once the relative magnitudes of the output voltages of the two rectifier units reach a predetermined value, to thereby provide a minimum excitation limit for the generator which follows the pull-out characteristic of said generator.

3. In a regulator system for a generator having a field winding and disposed to supply energy to a three-phase circuit, the combination comprising, a sensing circuit including two rectifier units each having input and output terminals, a potential transformer having two secondary winding sections and a primary winding responsive to the voltage across two phases of the three-phase circuit, an impedance member responsive to the current flow through the third phase of the three-phase circuit, circuit means for connecting one of the secondary winding sections to the input terminals of one of the two rectifier units, other circuit means for connecting the other secondary winding section in series circuit relationship with said impedance member and for connecting the series circuit to the input terminals of the other of the two rectifier units, and an electrical network connected to the output terminals of the two rectifier units for producing at its output a direct-current voltage that is a measure of the difference in the output voltages of the two rectifier units, a magnetic amplifier having control windings responsive to the output voltage of the generator, the magnetic amplifier being connected to control the magnitude of the current flow through the field winding of the generator in accordance with the magnitude of the output voltage of the generator, another impedance member connected to be responsive to said direct-current voltage so that the magnitude of the voltage across a predetermined portion of said another impedance member varies in accordance with the magnitude of the said direct-current voltage, and a shunting circuit interconnected with the said another impedance member and with the control windings of the magnetic amplifier, the shunting circuit functioning to shunt a portion of the current, flowing through the control windings of the magnetic amplifier, through the said another impedance member once the magnitude of the said direct-current voltage reaches a predetermined value, to thereby prevent the field excitation of the generator from decreasing below a predetermined value which follows the pull-out characteristic of said generator.

4. In a regulator system for a generator having a field winding and disposed to supply energy to a three-phase circuit, the combination comprising, a sensing circuit including two rectifier units each having input and output terminals, a potential transformer having two secondary winding sections and a primary winding responsive to the voltage across two phases of the three-phase circuit, an impedance member responsive to the current flow through the third phase of the three-phase circuit, circuit means for connecting one of the secondary winding sections to the input terminals of one of the two rectifier units, other circuit means for connecting the other secondary winding section in series circuit relationship wtih said impedance member and for connecting the series circuit to the input terminals of the other of the two rectifier units, and an electrical network connected to the output terminals of the two rectifier units for producing at its output a direct-current voltage that is a measure of the difference in the output voltages of the two rectifier units, a magnetic amplifier having control windings responsive to the output voltage of the generator, the magnetic amplifier being connected to control the magnitude of the current flow through the field winding of the generator in accordance with the magnitude of the output voltage of the generator, another impedance member connected to be responsive to said direct-curent voltage so that the magnitude of the voltage across a predetermined portion of said another impedance member varies in accordance with the magitude of the said direct-current voltage, and a rectifier for connecting the predetermined portion of the said another impedance member in parallel circuit relationship with the control windings of the magnetic amplifier, so that a portion of the current flowing through the control windings of the magnetic amplifier is shunted through said predetermined portion of the said another impedance member once the magnitude of the voltage across the said predetermined portion of the said another impedance member reaches a predetermined value, to thus prevent the excitation of the generator from decreasing below a predetermined value which follows the pull-out characteristic of said generator.

References Cited in the file of this patent

UNITED STATES PATENTS

| | | |
|---|---|---|
| 2,412,442 | Crever et al. | Dec. 10, 1946 |
| 2,576,647 | Sikorra | Nov. 27, 1951 |
| 2,608,679 | Witzke | Aug. 26, 1952 |
| 2,672,585 | Hotson | Mar. 16, 1954 |
| 2,700,748 | Britten et al. | Jan. 25, 1955 |